(12) United States Patent
Hoffman et al.

(10) Patent No.: US 6,727,899 B2
(45) Date of Patent: Apr. 27, 2004

(54) SYSTEM AND METHOD FOR OCCLUSION CULLING GRAPHICAL DATA

(75) Inventors: Don B. Hoffman, Fort Collins, CO (US); Joseph Norman Gee, Fort Collins, CO (US); Ross Cunniff, Fort Collins, CO (US); Howard D Stroyan, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 46 days.

(21) Appl. No.: 09/903,073

(22) Filed: Jul. 10, 2001

(65) Prior Publication Data

US 2001/0043216 A1 Nov. 22, 2001

Related U.S. Application Data

(63) Continuation-in-part of application No. 09/292,906, filed on Apr. 16, 1999, now Pat. No. 6,476,806.

(51) Int. Cl.[7] .............................................. G06T 17/00
(52) U.S. Cl. ........................................ 345/421; 345/422
(58) Field of Search ................................ 345/418, 419, 345/421, 420, 426, 427, 422

(56) References Cited

U.S. PATENT DOCUMENTS

| | | | | |
|---|---|---|---|---|
| 5,751,291 | A | | 5/1998 | Olsen et al. ................. 345/422 |
| 5,757,321 | A | | 5/1998 | Billyard ....................... 345/434 |
| 6,088,035 | A | | 7/2000 | Sudarsky et al. ........... 345/421 |
| 6,111,582 | A | * | 8/2000 | Jenkins ........................ 345/421 |
| 6,246,415 | B1 | | 6/2001 | Grossman et al. .......... 345/422 |
| 6,292,194 | B1 | * | 9/2001 | Powell, III .................. 345/582 |
| 6,445,391 | B1 | * | 9/2002 | Sowizral et al. ............ 345/421 |

* cited by examiner

*Primary Examiner*—Cliff N. Vo

(57) ABSTRACT

A graphical display system of the present invention efficiently performs occlusion culling based on frame-to-frame temporal coherency. The graphical display system utilizes a frame buffer and rendering logic. The rendering logic is configured to receive graphical objects that define an image frame. In response to receiving one of the objects, the rendering logic is configured to make a determination as to whether the one object is visible in a previous image frame that was previously rendered to the frame buffer. The rendering logic is further configured to render the one object to the frame buffer based on the determination.

29 Claims, 3 Drawing Sheets

SYSTEM AND METHOD FOR OCCLUSION CULLING GRAPHICAL DATA

CROSS REFERENCE TO RELATED APPLICATION

This document is a continuation-in-part of and claims priority to U.S. patent application Ser. No. 09/292,906, entitled "A Method and Apparatus for Performing Occlusion Testing While Exploiting Frame-to-Frame Temporal Coherence" and filed on Apr. 16, 1999 now U.S. Pat. No. 6,476,806, which is incorporated herein by reference.

BACKGROUND OF THE INVENTION

1. Field of the Invention

The present invention generally relates to graphical display systems and, in particular, to a system and method for occlusion culling graphical data based on frame-to-frame temporal coherence.

2. Related Art

A three-dimensional (3-D) graphical display system typically renders three-dimensional images to a two-dimensional display screen, which displays the three-dimensional images to a user. The display screen is divided into discrete picture elements ("pixels"), and each pixel is colored a particular color based on the data rendered by the graphical display system.

In this regard, an application program, sometimes referred to as a "graphics application," normally includes graphical data defining a frame of a graphical image. This frame often includes multiple three-dimensional objects that are each defined by different sets of graphical data, referred to as primitives. To display the image frame, the graphical data (i.e., the primitives) defining the objects of the frame are transmitted to a graphics pipeline that renders the graphical data via well known techniques. More specifically, the graphics pipeline determines how each pixel of the display screen should be colored in order for the display screen to display the image frame defined by the graphical data. The color value of each pixel is stored in a frame buffer, and the display screen is designed to read the frame buffer, typically via a rasterization process, and to color each pixel its corresponding color value from the frame buffer. Once each pixel has been colored its corresponding color value from the frame buffer, the display screen should be displaying a two-dimensional representation of the three-dimensional objects defined by the graphical data transmitted to the graphics pipeline.

The graphical data of each object includes position values that define the object's position relative to the other objects of the frame. The graphics pipeline translates these position values into (X, Y, Z) coordinate values that represent the object's position on the display screen. The X and Y coordinate values are aligned with the rows and columns of the display screen, and the Z coordinate value represents the object's depth (i.e., the object's distance along the axis that is perpendicular to the display screen).

Since objects can be positioned at different depths, it is possible for a first object to wholly or partially occlude a second object. This occurs when the first object and the second object have at least one set of coordinates with the same respective X and Y values but different Z values. In such a case, the first object, when displayed on the display screen, should appear to be in front of the second object. Therefore, the pixel having the foregoing X and Y values should normally be colored the appropriate color of the first object (i.e., the front object) instead of the color of the second object (i.e., the back object), assuming that the front object is not occluded by another object. As used hereafter, any object of an image frame having at least one non-occluded primitive shall be referred to as "visible."

Since only visible objects are displayed by the display screen, the rendering of non-visible or occluded objects often decreases the efficiency of the graphical display system. Thus, many conventional graphical systems perform occlusion culling to limit the rendering of occluded objects. There are many different types of occlusion culling techniques, but in general, occlusion culling involves the steps of determining whether a current object is occluded by a previously rendered object and then preventing further processing of the current object, if the current object is occluded.

Occlusion culling can be performed by the graphics application that transmits the objects to the graphics pipeline. In such an embodiment, the application, before transmitting the current object to a graphics pipeline, occlusion tests the current object against the graphical data defining objects previously transmitted to the graphics pipeline for the same image frame. Alternatively, occlusion culling can be performed by the graphics pipeline. In such an embodiment, the graphics pipeline occlusion tests the current object shortly after receiving it from the application and before substantial rendering of the current object has been performed by the pipeline.

Bounding box techniques may be utilized to increase the efficiency of the occlusion tests. In this regard, before the current object is rendered, an object, referred to as a "bounding box," is defined that encompasses each primitive of the current object. The bounding box may be defined by only a few primitives while the current object may be defined by many thousands of primitives. The bounding box is then occlusion tested against the previously rendered objects. If the bounding box is determined to be occluded by the occlusion test, then the current object is assumed to be occluded and rendering of the current object is prevented. However, if the bounding box is determined to be visible by the occlusion test, then the current object is assumed to be visible and is, therefore, rendered. Bounding box techniques make occlusion testing much more efficient by decreasing the number of primitives manipulated during an occlusion test.

A shortcoming of many existing occlusion culling techniques is that an occluded object may be occlusion tested before the occluder (i.e., the object that blocks or occludes the occluded object) is rendered. In such a case, the occluded object is normally determined to be visible by the occlusion test. Thus, the occluded object is typically rendered to the frame buffer and then replaced by the occluder once the occluder is rendered. In general, the processing time spent processing or rendering the occluded object is wasted, thereby decreasing the efficiency of the graphics display system.

To help minimize the impact of the foregoing shortcoming, some occlusion culling techniques sort objects from front to back (i.e., sort the objects based on their Z value) before performing occlusion culling. The objects that are closer to the screen and, therefore, more likely to be occluders are rendered first so that any occluded object is likely to be occlusion tested after the front objects have been rendered. However, front-to-back sorting for each frame increases the overall processing time of the graphical display system. Other techniques exist for occlusion culling, but these other techniques typically suffer from similar limitations.

SUMMARY OF THE INVENTION

Thus, a heretofore unaddressed need exists in the industry for providing a more efficient occlusion culling system and method. Generally, the present invention provides a system and method for efficiently occlusion culling graphical data based on frame-to-frame temporal coherence.

In architecture, the system of the present invention utilizes a frame buffer and rendering logic. The rendering logic is configured to receive graphical objects that define an image frame. In response to receiving one of the objects, the rendering logic is configured to make a determination as to whether the one object is visible in a previous image frame that was previously rendered to the frame buffer. The rendering logic is further configured to render the one object to the frame buffer based on the determination.

The present invention can also be viewed as providing a graphical display method. The method can be broadly conceptualized by the following steps: receiving a graphical object of an image frame; determining, in response to the receiving step, whether the object is visible in a previously rendered image frame that is being displayed by a display device; rendering the object to a frame buffer based on the determining step; and displaying, via the display device, an image based on data stored in the frame buffer.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
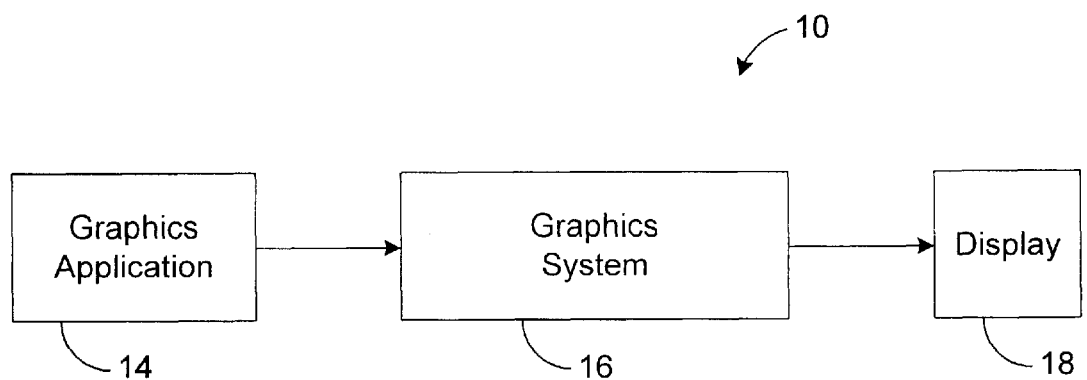
FIG. 1 is a block diagram illustrating a graphical display system in accordance with the present invention.

In general, the present invention pertains to a system and method for efficiently occlusion culling graphical data. FIG. 1 depicts a graphical display system 10 that may be utilized to render graphical data in accordance with the present invention. As shown by FIG. 1, the system 10 comprises a graphics application 14 that includes graphical data or primitives defining graphical objects. In order to display a frame of a graphical image, the application 14 transmits the primitives defining the objects of the frame to a graphics system 16 that is designed to render the graphical data into a form that can be read by a display device 18 via conventional techniques. One or more computer systems or workstations may be utilized in implementing the components of graphical display system 10.

Figure 2:
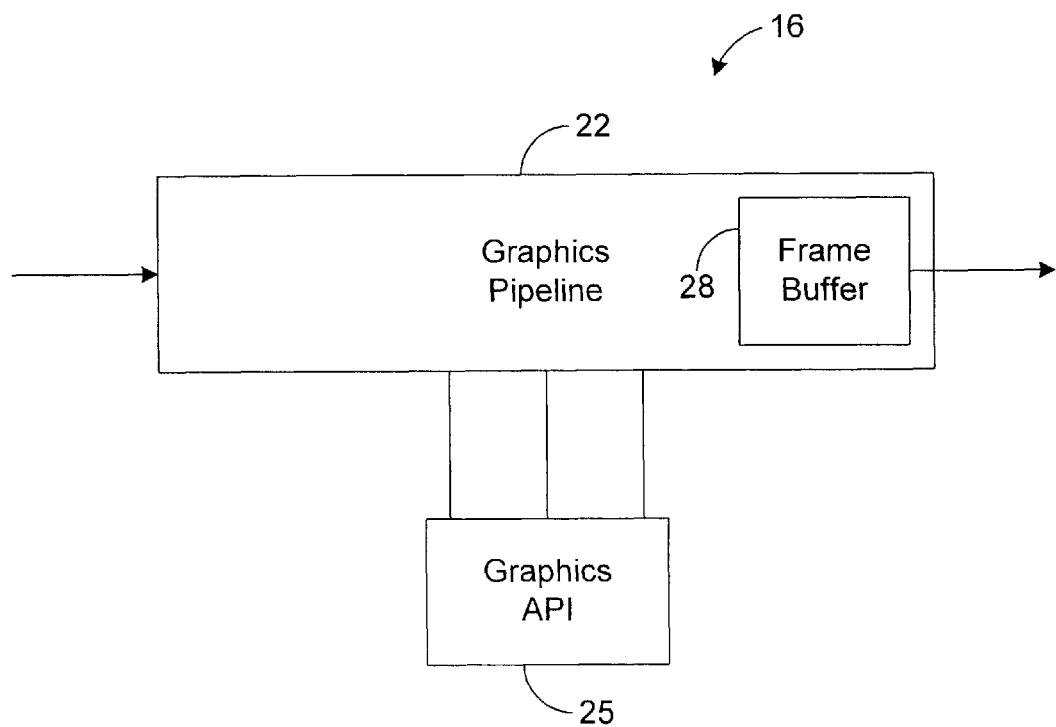
FIG. 2 is a block diagram illustrating a more detailed view of a graphics system depicted in FIG. 1.

FIG. 2 depicts a more detailed view of the graphics system 16. The graphics system 16 can be implemented in hardware, software, or a combination thereof. In the embodiment shown by FIG. 2, the graphics system 16 includes a hardware component, referred to as graphics pipeline 22, and a software component, referred to as graphics application programmatic interface (API) 25. The graphics API 25 is configured to transmit control signals to the pipeline 22 for controlling the rendering performed by the pipeline 22.

In this regard, the pipeline 22 receives the primitives transmitted by application 14. The primitives are preferably transmitted within commands recognizable to the graphics API 25. For example, the graphics commands may instruct the graphics system 16 to draw objects defined by the primitives included in the commands. These graphics commands may be defined in accordance with a known graphics command protocol, such as OpenGL, for example, and the graphics API 25 is preferably configured to recognize the graphics commands and to control the pipeline 22 such that the pipeline 22 properly performs the commanded functionality. For example, if the graphics system 16 receives commands for drawing an object, the graphics API 25 controls the pipeline 22 such that the pipeline 22 appropriately renders to a frame buffer 28 the color values of the primitives defining the object or, in other words, the primitives included in the foregoing commands. The display device 18, in turn, displays the object by coloring its pixels according to the foregoing color values rendered to the frame buffer 28.

Figure 3:
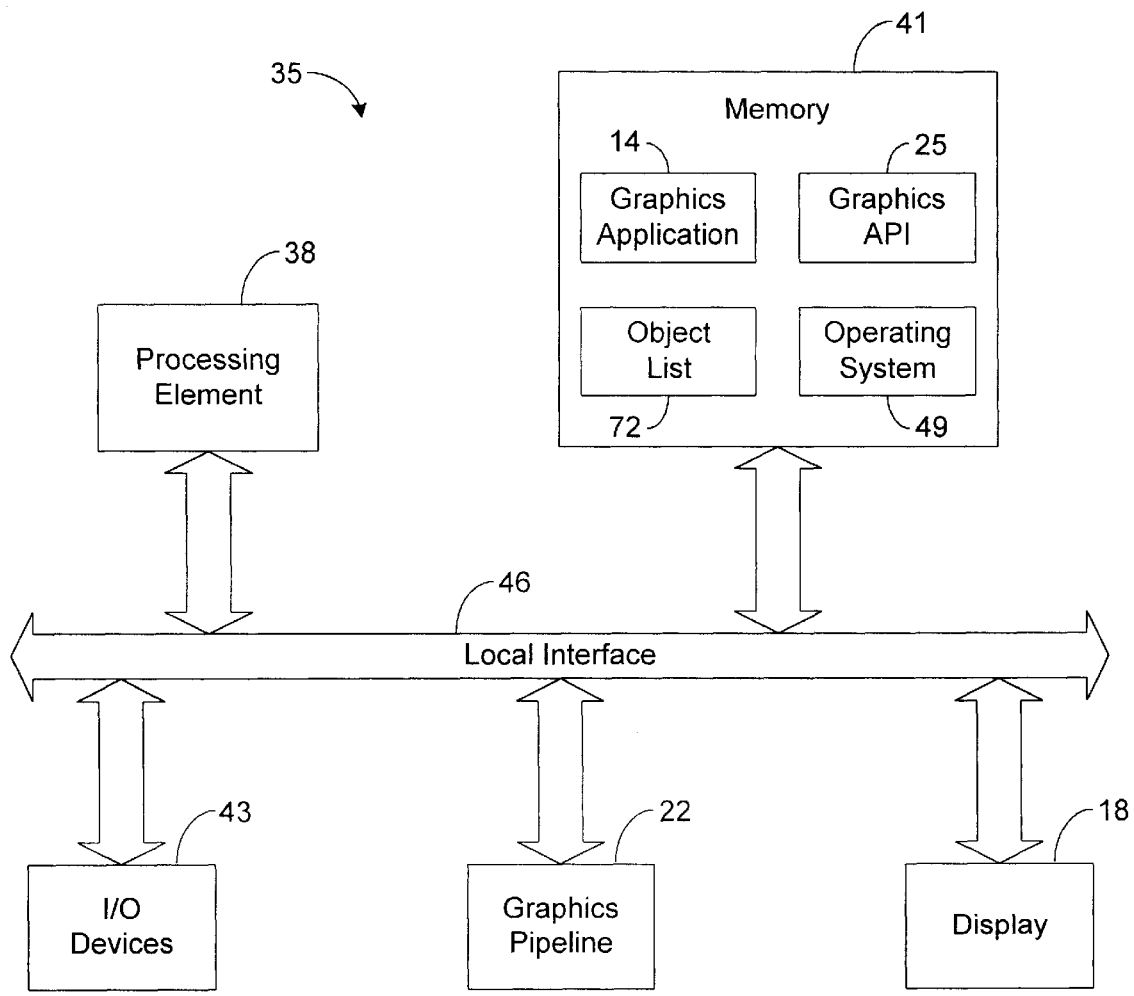
FIG. 3 is a block diagram illustrating a computer system that may be utilized to implement the graphical display system depicted in FIG. 1.

FIG. 3 depicts an exemplary embodiment of a computer system 35 that can be utilized in implementing the graphical display system 10 of the present invention. Generally, in terms of hardware architecture, the computer system 35 includes a processing element 38, memory 41, and one or more input and/or output (I/O) devices 43 (or peripherals) that are communicatively coupled via a local interface 46. The graphics pipeline 22 and display device 18 of graphical display system 10 (FIG. 1) are also communicatively coupled to the local interface 46, as shown by FIG. 3. The local interface 46 can be, for example but not limited to, one or more buses or other wired or wireless connections, as is known in the art. The local interface 46 may have additional elements, which are omitted for simplicity, such as controllers, buffers (caches), drivers, repeaters, and receivers, to enable communications. Further, the local interface 46 may include address, control, and/or data connections to enable appropriate communication among the aforementioned components.

The processing element 38 is preferably a hardware device for executing software that can be stored in memory 41. The processing element 38 can be any custom made or commercially available processor, such as but not limited to, a digital signal processor (DSP), a central processing unit (CPU) or an auxiliary processing element among several processing elements associated with the computer system 35, and a semiconductor based microprocessing element (in the form of a microchip) or a macroprocessing element.

The memory 41 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 41 may incorporate electronic, magnetic, optical, and/or other types of storage media. Note that the memory 41 can have a distributed architecture, where various components are situated remote from one another, but can be accessed by the processing element 38.

The software in memory 41 may include one or more separate programs, each of which comprises an ordered listing of executable instructions for implementing logical functions. In the example of FIG. 3, the software in the memory 41 includes the graphics application 14 and the graphics API 25 of the graphical display system 10. The memory 41 also includes a suitable operating system (O/S) 49 that, through well known techniques, controls the resources of the computer 35. More specifically, the operating system 49 preferably controls the execution of other computer programs, such as the graphics application 14, and provides scheduling, input-output control, file and data management, memory management, communication control, and other related services.

The graphics application 14 and the graphics API 25 may be source programs, executable programs (object code), scripts, or any other entities comprising a set of instructions to be performed. When implemented as source programs, the application 14 and graphics API 25 may need to be translated via a compiler, assembler, interpreter, or the like, which may or may not be included within the memory 41, so as to operate properly in connection with the O/S 49 and processing element 38.

The I/O devices 43 may include input devices, for example but not limited to, a keyboard, mouse, scanner, microphone, etc. Furthermore, the I/O devices 43 may also include output devices, for example but not limited to, a printer, display, etc. In addition, the I/O devices 43 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer system 35 is a PC, workstation, or the like, the software in the memory 41 may further include a basic input output system (BIOS) (omitted for simplicity). The BIOS is a set of essential software routines that initialize and test hardware at startup, start the O/S 49, and support the transfer of data among the hardware devices. The BIOS is stored in ROM so that the BIOS can be executed when the computer system 35 is activated.

When the graphics application 14 and graphics API 25 are implemented in software, as is shown in FIG. 3, it should be noted that the graphics application 14 and graphics API 25 can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In order to increase its efficiency, the graphical display system 10 preferably performs occlusion culling. In occlusion culling, an object being processed by the system 10 is tested for occlusion against the objects that have already been rendered to frame buffer 28 and that are, therefore, defined by the data stored in the frame buffer 28. If the test determines that the current object is occluded by an object presently defined by the frame buffer 28, then further processing or rendering of the occluded object is prevented. However, if the test determines that the current object is visible (i.e., not occluded by any of the objects presently defined by the frame buffer 28), then processing or rendering of the current object is continued. Note that conventional bounding box techniques may be employed to increase the efficiency of the occlusion tests.

In the preferred embodiment, the system 10 implements the temporal coherency occlusion culling methodology described by copending U.S. patent application Ser. No. 09/292,906, entitled "A Method and Apparatus for Performing Occlusion Testing While Exploiting Frame-to-Frame Temporal Coherence," which is incorporated herein by reference. In temporal coherency occlusion culling, it is assumed that a high percentage of the visible objects of a previous image frame will be visible in the next successive image frame. Therefore, in rendering the next successive image frame, the objects visible in the previous frame are first rendered to a frame buffer. Then, occlusion testing is performed to determine whether any of the objects occluded in the previous frame are visible in the next frame. Any objects determined to be occluded in the previous frame but visible in the next frame are then rendered to the frame buffer. By processing the next frame such that objects previously visible in the previous frame are rendered to the frame buffer before objects previously occluded in the previous frame, it is more likely that an object occluded in the next frame will fail the occlusion test before being rendered to the frame buffer. Thus, more occluded objects fail the occlusion testing in the next frame, making the graphical display system 10 more efficient.

The temporal coherency occlusion culling methodology may be implemented and performed by the graphics application 14. However, in some embodiments, it may be desirable for this occlusion culling methodology to be implemented by the graphics system 16 instead of the application 14. In this regard, implementing the temporal coherency occlusion culling methodology via the graphics system 16 may make the occlusion culling transparent to the application 14. Therefore, when the temporal coherency occlusion culling methodology is implemented by the graphics system 16, many different types of conventional graphics applications may be utilized to implement the graphics application 14 of the present invention without having to modify the conventional graphics applications.

The temporal coherency occlusion culling methodology implemented by the graphics system 16 will now be described in more detail. In this regard, the application 14 successively transmits different frames of graphical data to the graphics system 16 in the order that the frames are to be displayed on the display 18. For each graphical frame, the application 14 transmits the graphical data or primitives defining each object of the frame to the graphics system 16. The data transmitted by the application 14 may be in conformance with any known graphics protocol, such as OpenGL, for example.

For each object of the current frame, the graphics system 16 is configured to determine whether or not the object was visible in the previous frame (i.e., the frame presently being displayed by the display device 18). In this regard, the graphics system 14 is configured to maintain an object list 72 within memory 41. This object list 72 identifies each object within the image or images being processed by the graphics system 16. To form the list 72, the system 16 adds to the list 72 any newly received object that is not already identified by the list 72. Thus, after processing the first frame of an image, the object list 72 should identify each object within the image.

The list 72 preferably indicates whether each object in the list 72 was visible in the previous frame rendered by the graphics system 16. Furthermore, for each object of the current frame, the system 16 is configured to analyze the object list 72 to determine whether or not the object was visible in the previous frame. If the object was visible in the previous frame, then the graphics system 16 is configured to render the object to the frame buffer 28 and to store the object in the memory 41. However, if the object was not visible in the previous frame, then the graphics system 16 is configured to store the object in the memory 41 without rendering the object to the frame buffer 28.

After processing each object of the current frame as described above, the graphics system 16 then occlusion tests the objects of the current frame. Each object occluded in the previous frame and determined to be visible in the current frame by the foregoing occlusion testing is then retrieved from memory 41 and rendered to the frame buffer 28 by the graphics system 16. After completing this process, the frame buffer 28 should appropriately define the current frame, and the display device 18 may, therefore, display the graphical data included in the frame buffer 28 according to conventional techniques.

It should be noted that, at some point during the processing of the current frame, the graphics system 16 updates the object list 72 such that the object list 72 identifies each object that is visible in the current frame. Thus, after processing the graphical data of the current frame as described above, the object list 72 should be in a form that can be analyzed by the graphics system 16, according to the techniques described above, in processing the objects of the next successive frame.

OPERATION

Figure 4:
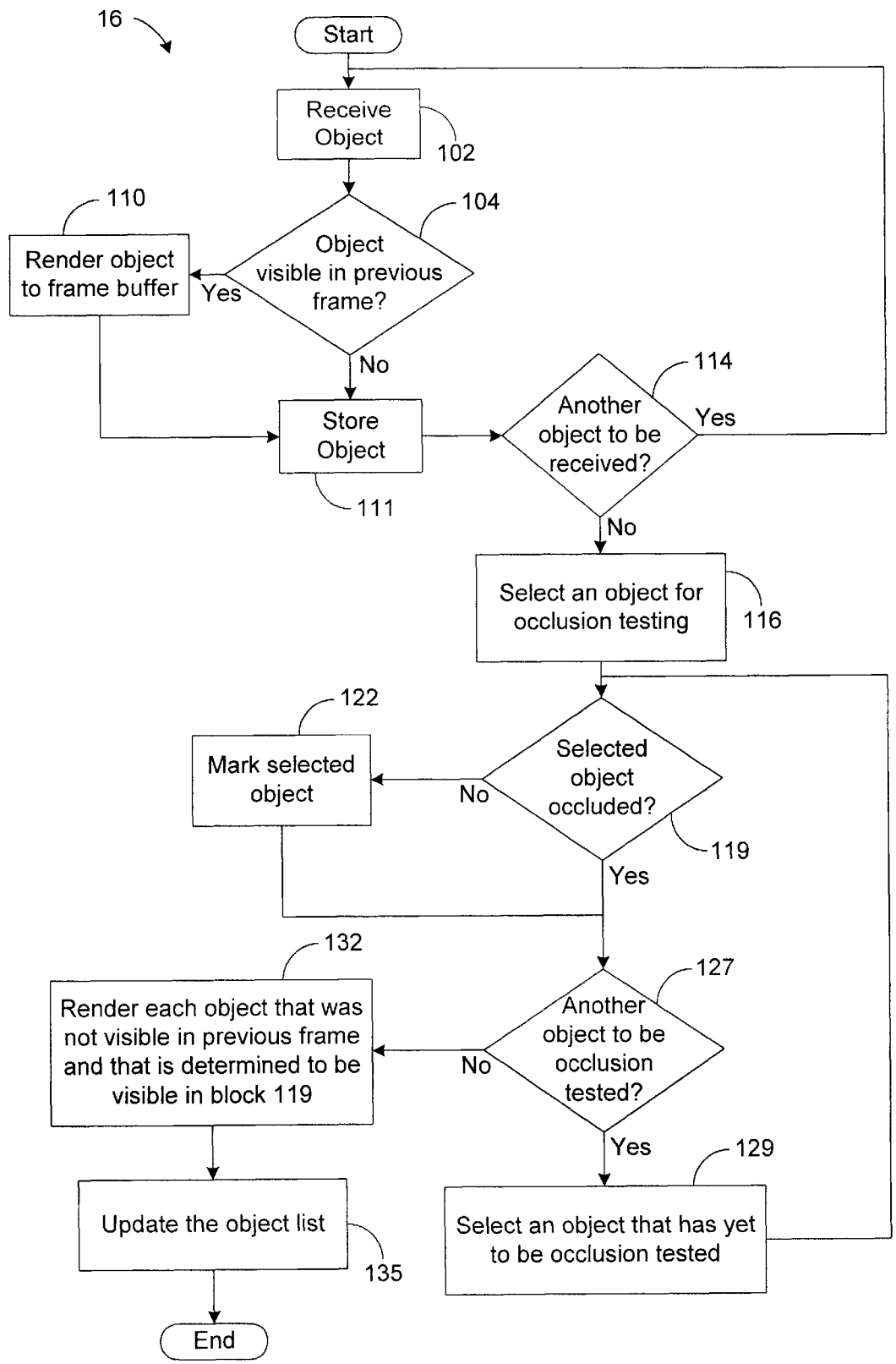
FIG. 4 is a flow chart illustrating the architecture and functionality of the graphics of FIG. 2 in processing a frame of graphical data.

The preferred use and operation of the graphical display system 10 and associated methodology are described hereafter with particular reference to FIG. 4.

Assume that a frame of a graphical image is being displayed by display device 18. Data defining the graphical image is stored in the frame buffer 28, which is read by the display device 18 according to conventional techniques in order to generate the image defined by the frame buffer 28. Furthermore, each object within the image is identified by the object list 72. Once the aforementioned frame has been rendered to the frame buffer 28, the graphics application 14 begins to transmit the objects of a new frame to graphics system 16. This new frame shall be referred to hereafter as the "current frame," and the frame previously rendered (i.e., the frame being displayed when the application 14 begins to transmit the current frame) shall be referred to hereafter as the "previous frame."

When the graphics system 16 receives an object of the current frame, the graphics system 16 analyzes the object list 72 to determine whether the object was visible in the previous frame, as depicted by blocks 102 and 104 of FIG. 4. If the object list 72 indicates that the object was visible in the previous frame, then the graphics system 16 renders the object to the frame buffer 28 and stores the object into memory 41, as shown by blocks 104, 110, and 111. However, if the object list 72 indicates that the object was not visible in the previous frame, then the graphics system 16 stores the object into memory 41 without rendering the object to the frame buffer 28, as shown by blocks 104 and 111. As shown by block 114, the foregoing process is repeated for each object received by the graphics system 16 until the system 16 has received each object of the current frame.

Once each of the objects of the current frame has been received by the graphics system 16, the system 16 then occlusion tests the objects of the current frame. Thus, in the embodiment shown by FIG. 4, the graphics system 16, in block 116, selects an object of the current frame. As shown by block 119, the graphics system 16 then occlusion tests the selected object based on the data presently stored in the frame buffer 28. The graphics system 16 may utilize any conventional occlusion testing technique to determine whether or not the selected object is occluded by any of the objects defined by the frame buffer 28. In particular, conventional bounding box techniques are preferably used to occlusion test the selected object in order to increase the efficiency of the system 16.

If the selected object is determined to be visible in block 119, then the graphics system 16 marks the selected object in block 122 to indicate that the selected object should be rendered to the frame buffer 28. There are a variety of methodologies that may be employed to implement block 122. For example, in the preferred embodiment, each object stored in memory 41 is associated with a flag, referred to herein as a "visibility flag." This flag may be included in the object list 72 or may reside in another location of the system 16. When the object is stored into memory 41 in block 111, the object's visibility flag is initially deasserted. Once the object is determined to be visible in block 119, the graphics system 16 may then mark the object in block 122 by asserting the object's visibility flag. Thus, any object of the current frame stored in memory 41 via block 111 and having an asserted visibility flag should be rendered to the frame buffer 28, as will be described in more detail hereinafter. Note that utilization of a visibility flag is described herein for illustrative purposes only and that there are various other techniques that may be employed to perform block 122.

If the selected object is determined in block 119 to be occluded, then the system 16 refrains from marking the selected object. In other words, the system 16 skips block 122. Block 119 and, if appropriate, block 122 are preferably performed for each object of the current frame, as shown by blocks 127 and 129.

After occlusion testing each object of the current frame, the graphics system 16, as shown by block 132, then renders to the frame buffer 28 each object that was determined to be visible in block 119 and that was occluded in the previous frame. Thus, the graphics system 16, in implementing block 132, analyzes the visibility flags of the objects of the current frame to determine which objects are visible in the current frame and analyzes the object list 72 to determine which objects were occluded in the previous frame. The graphics system 16 then renders each object that is visible in the current frame (i.e., that has an asserted visibility flag) and that is indicated by the object list 72 as being occluded in the previous frame. After performing block 132, the rendering of the current frame to the frame buffer 28 is complete, and the display device 18 may then update, based on the data stored in the frame buffer 28, the image displayed by the display device 18.

Before processing the next successive frame (i.e., the frame that immediately follows the current frame), the graphics system 16 preferably updates the object list 72, as shown by block 135. In this regard, the system 16 updates the list 72 such that only the objects visible in the current frame are indicated as previously visible by the list 72. Therefore, the object list 72 should appropriately indicate, in block 104 for the next successive frame, which objects were previously visible.

It should be noted that objects rendered during block 132 may instead be rendered during the occlusion testing of the current frame. For example, once a selected object is determined to be visible in block 119, the selected object may be rendered to the frame buffer 28 before a "no" determination is made in block 129. Such an embodiment may cause fewer objects to be tested as visible in block 119. However, it is well-known that frequently switching a graphics system from an occlusion testing mode to a rendering mode typically causes inefficiencies. Thus, to help maximize the efficiency of the system 16, it is desirable to complete the occlusion testing of the objects of the current frame before performing block 132, as is shown by FIG. 4.

What is claimed is:

1. A graphical system, comprising:

a frame buffer; and rendering logic configured to receive graphical objects that define an image frame, said rendering logic configured to determine whether each of said objects is visible in a previous image frame that was previously rendered to said frame buffer, said rendering logic further configured to render a first one of said objects to said frame buffer based on a determination that said first object is visible in said previous image frame, said rendering logic further configured to prevent, based on a determination that a second one of said objects is not visible in said previous image frame, rendering of said second object to said frame buffer until at least rendering of said first object to said frame buffer is performed, said rendering logic further configured to perform an occlusion test on said second object after the rendering of said first object to said frame buffer.

2. The system of claim 1, further comprising a display device configured to display an image based on data stored in said frame buffer, wherein said display device is displaying said previous frame when said rendering logic receives said one object.

3. The system of claim 1, wherein said rendering logic is configured to determine in a plurality of determinations that each of a plurality of said objects is occluded in said previous frame and to store said plurality of objects into memory in response to said plurality of determinations.

4. The system of claim 3, wherein said rendering logic is further configured to perform a plurality of occlusion tests on each of said plurality of objects, based on data stored within said frame buffer and after the rendering said first object to said frame buffer, said rendering logic further configured to render to said frame buffer each of said plurality of objects determined to be visible via said plurality of occlusion tests.

5. The system of claim 4, wherein said rendering logic is configured to maintain visibility data indicative of which objects are visible in said previous frame, and wherein said rendering logic is configured to determine whether each of said objects received by said rendering logic is visible in said previous frame by analyzing said visibility data.

6. The system of claim 5, wherein said rendering logic is configured to update said visibility data based on which of said objects are determined to be visible via said plurality of occlusion tests.

7. A method, comprising:

receiving graphical objects of an image frame;

determining whether each of said objects is visible in a previously rendered image frame that is being displayed by a display device;

rendering, to a frame buffer, each of said objects determined to be visible in said determining;

performing occlusion tests on said objects;

rendering, to said frame buffer, at least one of said objects determined to be visible via at least one of said occlusion tests and determined to be not visible in said determining;

preventing, based on a determination in said determining that said at least one object is not visible in said previously rendered image frame, said at least one object from being rendered to said frame buffer until at least each of said objects determined to be visible in said determining is rendered to said frame buffer; and displaying, via said display device, an image based on data stored in said frame buffer.

8. The method of claim 7, further comprising storing said at least one object into memory in response to said determination.

9. The method of claim 7, further comprising maintaining visibility data indicative of which objects are visible in said previously rendered image frame, wherein said determining is based on said visibility data.

10. The method of claim 9, further comprising updating said visibility data based on said occlusion tests.

11. A method for occlusion culling graphical data, comprising:

receiving graphical objects that define an image frame;

determining whether each of said objects is visible in a previous image frame previously rendered to a frame buffer;

rendering to said frame buffer each of said objects identified as visible in said determining;

performing, subsequent to said rendering step, occlusion tests on each of said received objects;

rendering, based on said determining and performing steps, to said frame buffer each of said objects determined to be visible via said occlusion tests and determined to be not visible in said determining; and displaying said image frame defined by said graphical objects based on said objects rendered to said frame buffer in said renderings.

12. The method of claim 11, further comprising:

maintaining data indicative of which of said objects are visible in said previous image frame, wherein said determining is based on data.

13. The method of claim 12, further comprising updating said data based on said occlusion tests.

14. The system of claim 1, wherein said rendering logic is configured to analyze said objects in a first pass and a second pass that occurs subsequent to said first pass, said rendering logic configured to render to said frame buffer each of said objects determined, in said first pass, to be visible in said previous image frame, said rendering logic further configured to perform an occlusion test, in said second pass, on each of said objects.

15. The system of claim 1, wherein said rendering logic is configured to define an object list indicative of which of said objects are visible in said previous image frame, said rendering logic further configured to determine, for each of said objects received by said rendering logic, whether said received object is identified by said list and to add said received object to said list if said received object is not identified by said list.

16. The system of claim 1, further comprising a graphics application configured to transmit said graphical objects to said rendering logic, wherein said rendering logic comprises a graphics pipeline configured to render graphical data to said frame buffer and an application programmatic interface configured to control said graphics pipeline such that said graphics pipeline prevents, based on said determination, rendering of said second object to said frame buffer until at least rendering of said first object to said frame buffer is performed.

17. The system of claim 16, wherein said first object is received by said graphics pipeline after said second object.

18. The method of claim 7, further comprising initiating said performing step once each of said objects determined to be visible in said determining is rendered to said frame buffer.

19. The method of claim 7, further comprising:
defining data indicative of which of said objects are visible in said previously rendered image frame; and
updating said data based on one of said occlusion tests, said one occlusion test indicating whether one of said objects determined to be visible in said determining is occluded in a current image frame that is based on said renderings, said one occlusion test performed subsequent to said rendering, to a frame buffer, each of said objects determined to be visible in said determining.

20. The method of claim 7, further comprising:
defining an object list indicative of which of said objects are visible in said previously rendered image frame; and
for each of said received objects, determining whether said received object is identified by said object list and adding said received object to said object list if said received object is not identified by said object list.

21. The method of claim 11, further comprising:
defining data indicative of which of said objects are visible in said previously rendered image frame; and
updating said data based on one of said occlusion tests, said one occlusion test indicating whether one of said objects determined to be visible in said determining is occluded in a said displayed image frame.

22. The method of claim 11, further comprising:
defining an object list indicative of which of said objects are visible in said previously rendered image frame; and
for each of said received objects, determining whether said received object is identified by said object list and adding said received object to said object list if said received object is not identified by said object list.

23. The method of claim 11, further comprising storing into memory each of said objects identified as not visible in said determining.

24. A graphical system, comprising:
a frame buffer; and
rendering logic configured to receive graphical objects that define an image frame, said rendering logic configured to analyze each of said graphical objects in a first pass and to subsequently analyze said graphical objects in a second pass, said rendering logic configured to render to said frame buffer each of said objects determined, in said first pass, to be visible in a previous image frame that was previously rendered to said frame buffer, said rendering logic configured to perform occlusion tests, in said second pass, on each of said received objects, said logic further configured to render, based on said occlusion tests, to said frame buffer each of said objects determined to be visible via said occlusion tests and determined to be not visible in said previous image frame.

25. The system of claim 24, wherein said rendering logic is configured to define an object list indicative of which of said objects are visible in said previous image frame, said rendering logic further configured to determine, for each of said objects received by said rendering logic, whether said received object is identified by said list and to add said received object to said list if said received object is not identified by said list.

26. The system of claim 24, wherein said rendering logic is configured to define data indicative of which of said objects are visible in said previous image frame, said rendering logic further configured to update said data based on one of said occlusion tests performed on one of said objects determined, in said first pass, to be visible in said previous image frame.

27. A method, comprising:
receiving graphical objects that define an image frame;
analyzing each of said graphical objects in a first pass and subsequently analyzing said graphical objects in a second pass;
determining, in said second pass, whether each of said objects is visible in a previous image frame that was previously rendered to said frame buffer;
rendering to a frame buffer each of said objects determined, in said first pass, to be visible in said previous image frame;
performing occlusion tests, in said second pass, on said objects; and
rendering to said frame buffer each of said objects determined to be visible via said occlusion tests and determined to be not visible via said determining.

28. The method of claim 27, further comprising:
defining an object list indicative of which of said objects are visible in said previous image frame; and
for each of said received objects, determining whether said received object is identified by said list and adding said received object to said list if said received object is not identified by said list.

29. The method of claim 27, further comprising:
defining data indicative of which of said objects are visible in said previous image frame; and
updating said data based on one of said occlusion tests performed on one of said objects determined, in said first pass, to be visible in said previous image frame.

* * * * *